United States Patent
Duyck et al.

(10) Patent No.: US 11,035,132 B2
(45) Date of Patent: Jun. 15, 2021

(54) FLOOR COVERING MATERIAL AND METHOD FOR MANUFACTURING SAME

(71) Applicant: IVC, BVBA, Avelgem (BE)

(72) Inventors: Stefaan Gerard Lucien Duyck, Izegem (BE); Kristof Van Vlassenrode, Deinze (BE)

(73) Assignee: IVC BV, Avelgem (BE)

(*) Notice: Subject to any disclaimer, the term of this patent is extended or adjusted under 35 U.S.C. 154(b) by 4 days.

(21) Appl. No.: 15/852,645

(22) Filed: Dec. 22, 2017

(65) Prior Publication Data

US 2018/0202170 A1 Jul. 19, 2018

(30) Foreign Application Priority Data

Jan. 13, 2017 (BE) .................................. 2017/5019

(51) Int. Cl.
*E04F 15/02* (2006.01)
*B32B 38/00* (2006.01)
(Continued)

(52) U.S. Cl.
CPC ........ *E04F 15/02038* (2013.01); *B32B 37/24* (2013.01); *B32B 38/06* (2013.01);
(Continued)

(58) Field of Classification Search
CPC ......... E04F 2201/0115; E04F 15/02038; E04F 15/105; E04F 15/02161; E04F 13/0894;
(Continued)

(56) References Cited

U.S. PATENT DOCUMENTS 3,293,094 A * 12/1966 Frank .................. C08J 9/101
156/79
3,365,353 A * 1/1968 Witman .................. C08J 9/06
156/79
(Continued)

FOREIGN PATENT DOCUMENTS

CA 1046869 A 1/1979
EP 1236556 A1 9/2002
(Continued)

OTHER PUBLICATIONS

Extended European Search Report in related European Application No. 18150630.4-1014, dated May 24, 2018.
Search Report & Opinion dated Sep. 20, 2017, for BE 201705019.

*Primary Examiner* — Basil S Katcheves
*Assistant Examiner* — Omar F Hijaz
(74) *Attorney, Agent, or Firm* — Bacon & Thomas, PLLC

(57) ABSTRACT

Floor covering material, wherein this floor covering material comprises at least a foamed layer, a printed decor provided thereon, and preferably a transparent wear layer, wherein the printed decor represents a plurality of panel-shaped or tile-shaped elements, wherein at the edges of said represented elements, lowered edge regions are formed, which form at least a portion of the circumference of the respective element, wherein said lowered edge regions, seen in cross-section, are realized with at least two different geometries. The invention further also relates to a method for manufacturing such floor covering material.

21 Claims, 4 Drawing Sheets

(51) Int. Cl.
*B32B 38/06* (2006.01)
*B44C 1/24* (2006.01)
*E04F 15/10* (2006.01)
*B44C 5/04* (2006.01)
*D06N 7/00* (2006.01)
*B32B 37/24* (2006.01)
*E04F 13/08* (2006.01)

(52) U.S. Cl.
CPC .............. *B32B 38/145* (2013.01); *B44C 1/24* (2013.01); *B44C 5/04* (2013.01); *D06N 7/0007* (2013.01); *D06N 7/0013* (2013.01); *E04F 15/02033* (2013.01); *E04F 15/02161* (2013.01); *E04F 15/105* (2013.01); *E04F 15/107* (2013.01); *B32B 2038/0084* (2013.01); *B32B 2255/08* (2013.01); *B32B 2255/28* (2013.01); *B32B 2307/554* (2013.01); *E04F 13/0866* (2013.01); *E04F 13/0873* (2013.01); *E04F 13/0894* (2013.01); *E04F 2201/0115* (2013.01); *E04F 2203/02* (2013.01)

(58) Field of Classification Search
CPC .... E04F 13/0866; E04F 13/0873; B44C 5/04; B44C 1/24; D06N 7/0007; D06N 7/0013; B32B 2255/08; B32B 2255/28
See application file for complete search history.

(56) References Cited

U.S. PATENT DOCUMENTS

| | | | |
|---|---|---|---|
| 3,804,657 A * | 4/1974 | Eyman | D06N 7/0005 264/126 |
| 3,887,678 A | 6/1975 | Lewicki, Jr. | |
| 3,908,059 A * | 9/1975 | Prince | E04B 9/04 427/198 |
| 3,953,639 A | 4/1976 | Lewicki, Jr. | |
| 3,958,054 A | 5/1976 | McKee, Jr. et al. | |
| 4,614,680 A * | 9/1986 | Fry | B32B 3/30 428/158 |
| 5,728,332 A * | 3/1998 | Frisch | B05D 3/107 264/46.4 |
| 6,511,926 B1 * | 1/2003 | Kauffman | B32B 27/08 442/62 |
| 9,194,133 B2 * | 11/2015 | Thiers | E04F 15/02033 |

FOREIGN PATENT DOCUMENTS

| | | | |
|---|---|---|---|
| GB | 1171177 A | | 11/1969 |
| GB | 1255156 A | | 12/1971 |
| JP | 2002276139 A | * | 9/2002 |
| WO | 99/39042 A1 | | 8/1999 |
| WO | 2005/118947 A1 | | 12/2005 |
| WO | 2007/072198 A2 | | 6/2007 |
| WO | 2011/129757 A1 | | 10/2011 |

* cited by examiner

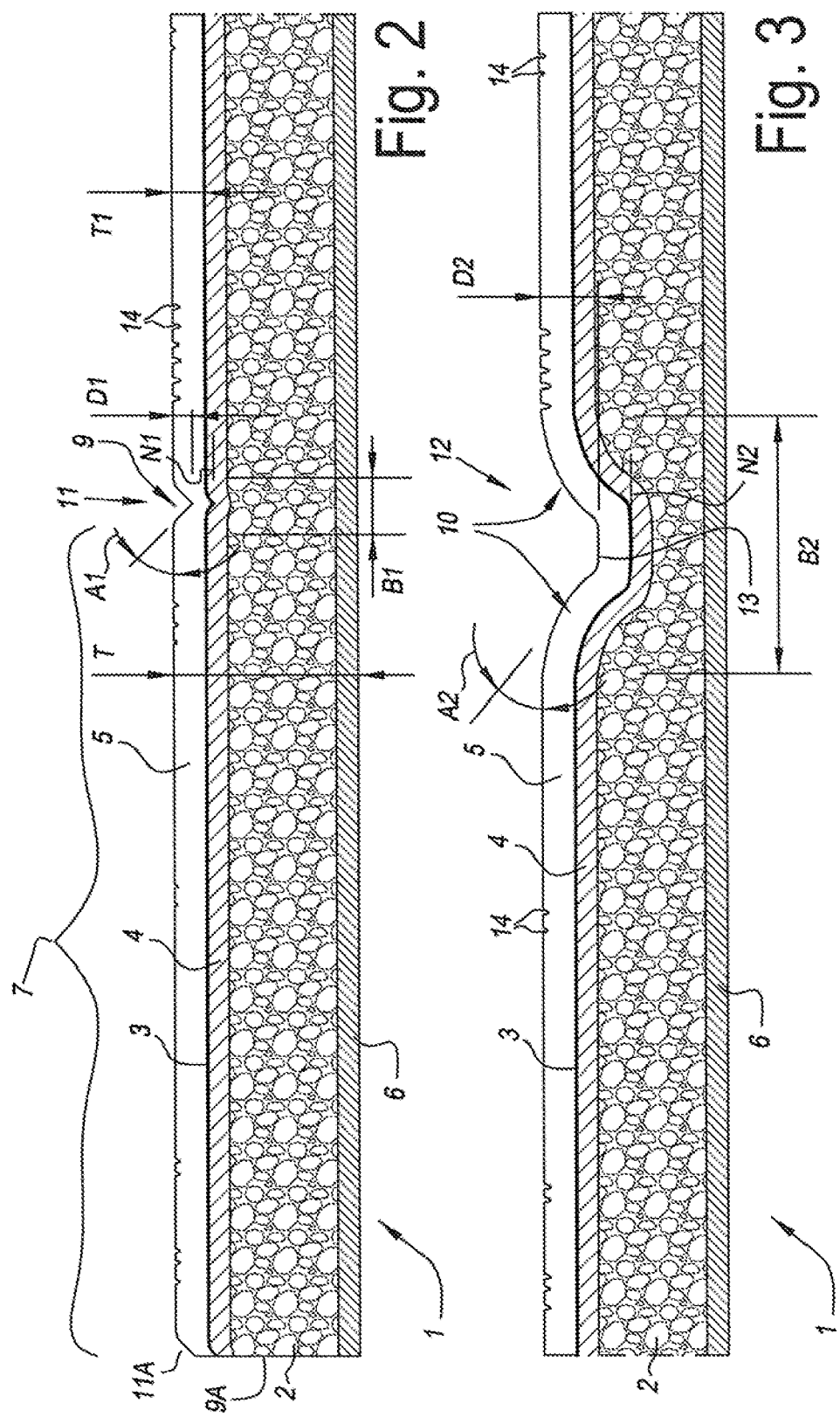

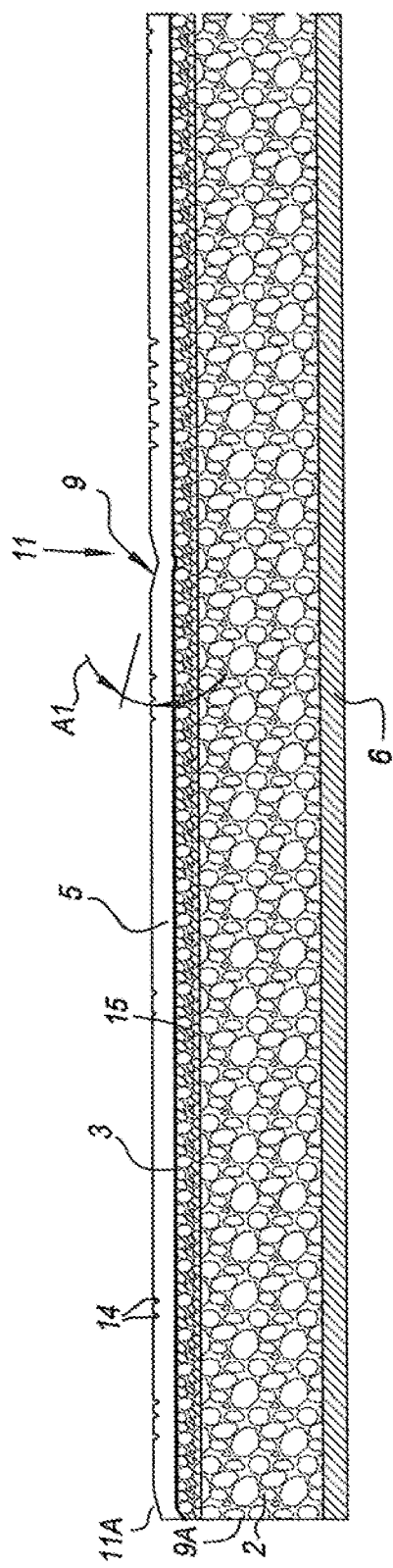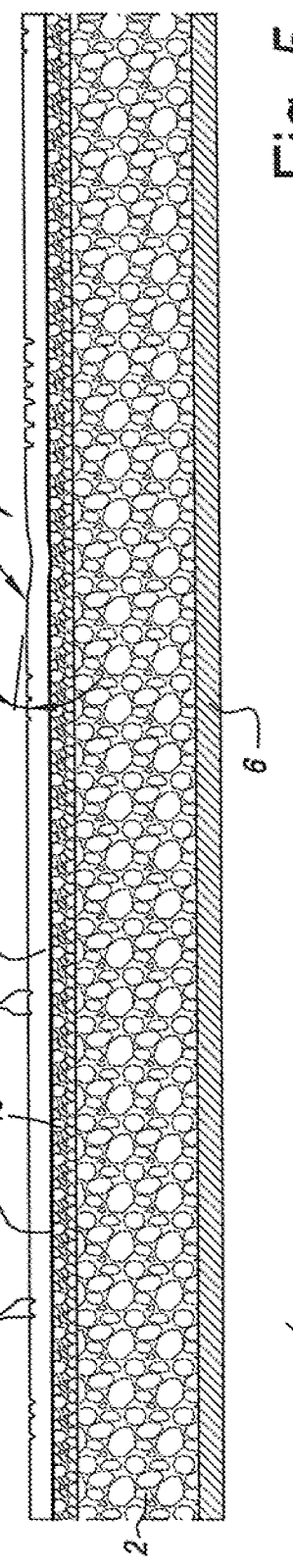

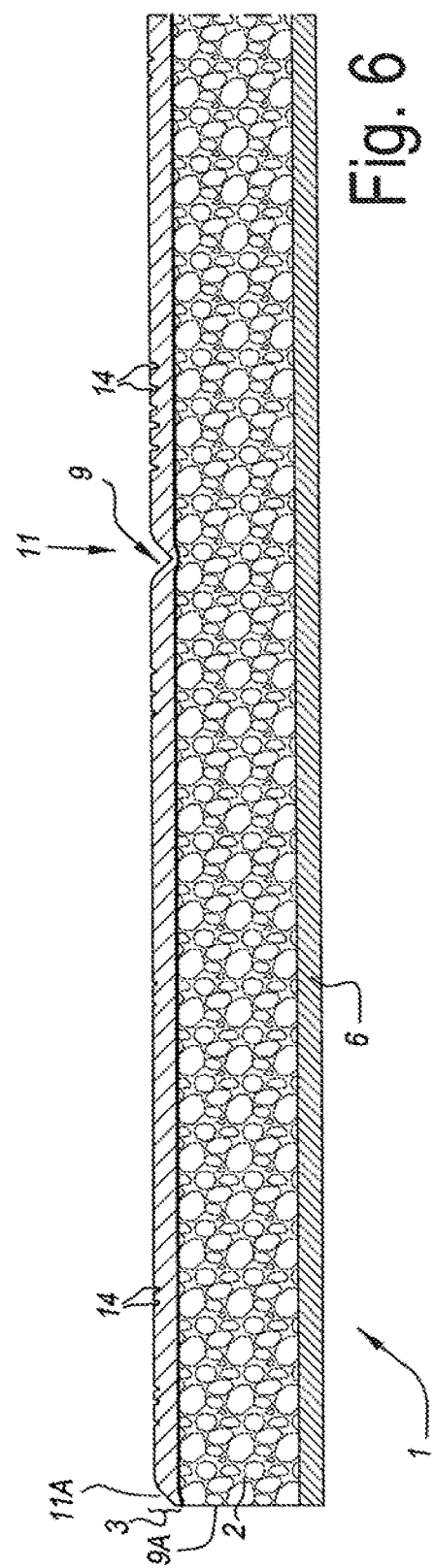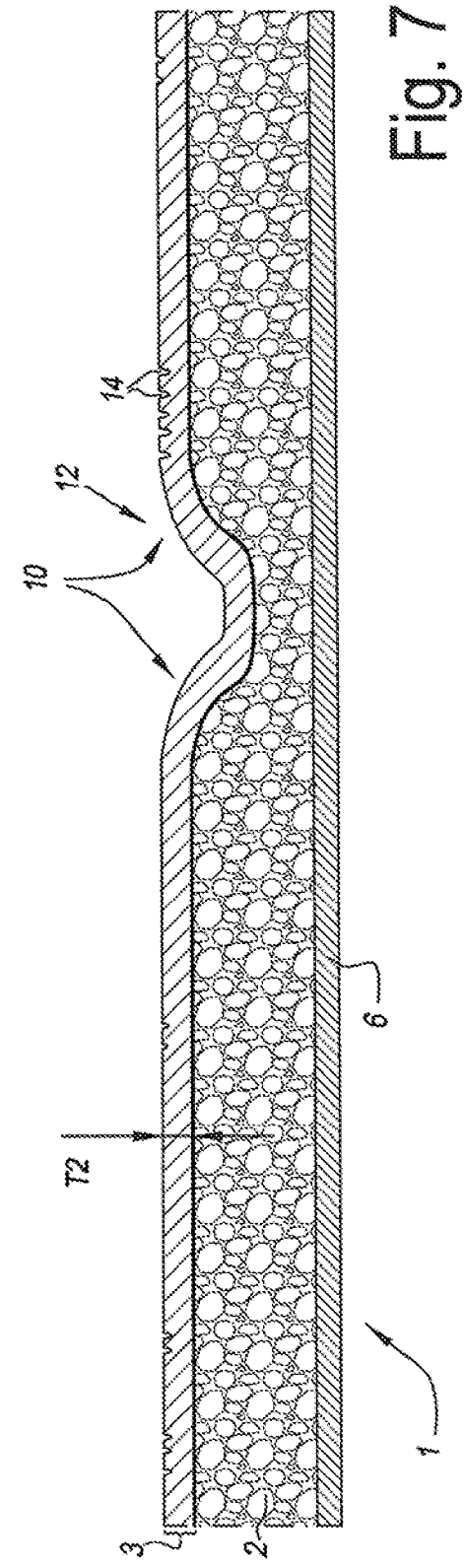

FLOOR COVERING MATERIAL AND METHOD FOR MANUFACTURING SAME

BACKGROUND OF THE INVENTION

This invention relates to a floor covering material and a method for manufacturing the same.

More particularly, the invention relates to a floor covering material of the so-called "cushion vinyl" type. Such floor covering material is widely known, for example, from CA 1 046 869 and WO 2005/118947. Herein, this may relate to a web-shaped floor covering material which is supplied from a roll. Then, in a room a plurality of webs cut to length can be installed next to each other, for example, by gluing the respective webs at their edges onto the subfloor or onto the underlying floor. Floor covering material of the "cushion vinyl" type can be composed starting with a carrier (In English, also called a "liner"), on which a foamed layer is situated, namely, the actual cushion vinyl layer. This foamed layer as such can consist of one or more sublayers. On the foamed layer then a printed decor is situated. The printed decor either can be applied as a foil printed beforehand, for example, a printed PVC foil, or can be formed directly on the foamed layer, for example, with the intermediary of suitable primers and other basic layers, such as layers on the basis of PVC plastisol. On the upper side, the printed decor is protected by a transparent wear layer, which also can be based on PVC (Polyvinyl chloride). Possibly, a superficial lacquer based on acrylate, urethane acrylate or polyurethane can be present on the surface of the wear layer.

In most cases, the floor covering material of the state of the art has a monotonous and glossy surface. Due to the reflection or scattering of incident light, the printed decor is invisible from a distance. As a result of this, the floor covering material rapidly is seen as a plastic imitation product.

From the state of the art, for example, from GB 1,171,177, U.S. Pat. No. 3,958,054, GB 1,255,156, U.S. Pat. Nos. 3,887,678 and 3,953,639, it is known to realize a relief at the surface of such floor covering material. GB'177, US'054 and GB'156 achieve the relief by applying the technique of chemically embossing or chemically providing with a relief, wherein the foaming degree of the foamed layer is influenced locally, for example, by means of a so-called inhibitor. A relief obtained by a chemical technique is coarse, shows strong roundings and hereby leaves little possibility for variation of the respective relief characteristics. US'678 and US'639 make use of mechanically embossing or mechanically providing with a relief, wherein a portion of the floor surface is impressed. In the examples of US'678 and US'639, a floor covering material with relief is achieved, the printed decor of which represents a plurality of tile-shaped elements, which, at the edges of said represented elements, show an imitation of cement joints. By means of mechanical impressions, sharp relief characteristics can be realized. In those cases in which the impressions have to coincide with characteristics of the printed decor, extreme measures are required in the production in order to provide and to keep the relief and the printed decor in register.

SUMMARY OF THE INVENTION

The present invention primarily aims at offering an alternative floor covering material, wherein according to various preferred embodiments solutions are offered to the problems with the floor covering materials and other covering materials of the state of the art.

To this aim, the invention, according to its first independent aspect, relates to a floor covering material, wherein this floor covering material comprises at least a foamed layer and a printed decor provided thereon, wherein the covering material further comprises a transparent wear layer, or wherein the printed decor forms the surface of the covering material, wherein the printed decor represents a plurality of panel-shaped or tile-shaped elements, wherein at the edges of said represented elements, lowered edge regions are formed, which form at least a portion of the circumference of the respective element, with the characteristic that said lowered edge regions, seen in cross-section, are realized with at least two different geometries. As at least two different geometries are applied, an improved life-like realization of the floor covering material can be obtained. The presence of lowered edge regions as such already interrupts the usual monotonous appearance of the floor covering material. The available different geometries further contribute to a more realistic representation of the panel-shaped or tile-shaped imitation product which is depicted in the printed decor. It is clear that the lowered edge regions of said first aspect of the invention correspond to the edges of the panels or tiles represented in the printed decor.

In those cases where no transparent wear layer is present and the printed decor forms the surface of the covering material, a very good representation of the printed decor is obtained, even in backlight conditions, wherein the lowered edge regions of different geometry further enhance the realistic impression. Preferably, in such case this relates to a digitally printed decor which is formed directly on the underlying layers of the floor covering material, preferably with the intermediary of one or more primers and/or basic layers, for example, based on PVC, such as based on PVC plastisol. Sufficient wear resistance can be obtained in that the inks as such show a certain wear resistance. This is the case, for example, with UV-hardened ink layers. According to another possibility, sufficient wear resistance is achieved in that the ink comprises PVC and/or hard particles, such as aluminum oxide, and/or in that the printed decor continues over a certain distance in depth in the underlying primers and/or basic layers, for example, over a distance of more than 0.1 millimeter. An example of a technique suitable for obtaining the last-mentioned possibility is described in WO 2011/129757.

Preferably, the circumference of each of said tile-shaped or panel-shaped elements each time comprises lowered edge regions of both types, namely, of both mutually differing geometries.

Preferably, said elements, which are represented in the printed decor, are rectangular. Preferably, said lowered edge regions in such case then extend along both pairs of opposite edges, wherein the lowered edge region, which extends along a first pair of said opposite edges, is realized with a geometry that differs from the geometry of the lowered edge region which extends along a second pair of said opposite edges. Preferably, the geometry of a lowered edge region indeed is constant or approximately constant along a substantial part of the edge or along the entire or approximately entire edge where this lowered edge region is situated. This latter preferably also is the case when said elements have another shape, for example, the shape of a hexagon or octagon. Preferably, the geometry of a lowered edge region is equal at both edges of the respective pair of opposite edges. In the case of rectangular and oblong elements, for example, lowered edge regions can be present at the pair of long edges and at the pair of short edges, wherein the lowered edge regions at both long edges are realized with an equal geometry, however, differing from the lowered edge regions at both short edges, which lowered edge regions at both short edges as such have a geometry which is mutually equal.

According to a deviating variant of the first aspect, the aforementioned elements are oblong, wherein the first pair of edges is formed by the long edges, and wherein instead of a lowered edge region with another geometry, no lowered edge region is present at the short edges. It is clear that such variant also contributes to enhancing the life-like realization of the floor covering material.

The aforementioned geometries may differ from each other in various possible manners, of which, without striving to be exhaustive, some important possibilities are listed herein below.

According to a first possibility, the floor covering material shows the feature that a first lowered edge region has a deepest point which is situated lower, higher, respectively, than the deepest point of a second lowered edge region. A difference in depth between two lowered edge regions, which preferably form at least a portion of the circumference of the same represented element, avoids that, seen in backlight, an unnaturally clean geometrical pattern would be observed.

According to a second possibility, the floor covering material shows the feature that a first lowered edge region at the actual surface of the floor covering material has a width which is more, less, respectively, than the width of a second lowered edge region at the actual surface of the floor covering material. The difference in width between two lowered edge regions, which preferably form at least a portion of the circumference of the same represented element, also contributes to avoiding the above-mentioned unnaturally clean geometrical pattern.

According to a third possibility, the floor covering material shows the feature that a first lowered edge region comprises walls which on average form an angle with the actual upper surface which is steeper, less steep, respectively, than in the case of a second lowered edge region. The difference in angles with two lowered edge regions, which preferably form at least a portion of the circumference of the same represented element, leads to a difference of reflection or scattering of incident light, which leads to a more realistic appearance of the floor covering material.

According to a fourth possibility, the floor covering material shows the feature that the foamed layer at the location of a first lowered edge region has a higher, lower, respectively, degree of foaming than at the location of a second lowered edge region. By degree of foaming, the weight reduction in the respective layer a the location of the respective edge region obtained by foaming is meant. The difference in the degree of foaming preferably is at least 20% of the global degree of foaming of the foamed layer. Instead of a difference in the degree of foaming, a difference in thickness of the foamed or to be foamed layer can be used, too. The difference in thickness preferably is also at least 20% of the global thickness of the floor covering material. So, for example, it is possible that the foamed layer at the location of the second lowered edge region is not or almost not foamed, as this lowered edge region is obtained by the technique of chemically providing embossments, whereas the foamed layer at the location of the first lowered edge region is foamed indeed, as this lowered edge region is obtained by the technique of mechanical embossment while keeping a significant portion of the foaming. It is clear that in such case the thickness of the foamed layer at the location of the first lowered edge region will be higher than at the location of the second lowered edge region. Further, it is clear that such floor covering material also fulfills the above-mentioned first possibility, wherein the second lowered edge region is realized deeper than the first lowered edge region.

According to a fifth possibility, the floor covering material shows the feature that a first lowered edge region is obtained by means of the technique of mechanical impressions, whereas a second lowered edge region is obtained by means of the technique of chemically providing impressions, or vice versa. The difference in method for obtaining a first and a second lowered edge region, which preferably form at least a portion of the circumference of the same element represented in the printed decor, inherently leads to a different geometry of the respective lowered edge regions.

According to a sixth possibility, the floor covering material shows the feature that a first lowered edge region has a V-shaped cross-section, whereas a second lowered edge region has a U-shaped cross-section, or vice versa. Herein, the edge region with the U-shaped cross-section has walls which are steeper than the edge region with the V-shaped cross-section, and/or a bottom zone which is wider than this is the case with the edge region with the V-shaped cross-section.

According to a seventh possibility, the floor covering material shows the feature that the printed decor at the location of a first lowered edge region is situated at a higher level than at the location of a second lowered edge region, or vice versa. So, for example, the printed decor at the location of the second lowered edge region can follow the geometry of this edge region, whereas the printed decor at the location of the first lowered edge region follows less or not at all. In this last case, the printed decor will pass through the lowered edge region at the same level as its global level in the floor covering material.

According to an eighth possibility, the floor covering material shows the feature that the transparent wear layer at the location of a first lowered edge region is thinner, thicker, respectively, than at the location of a second lowered edge region. The difference in thickness of the transparent wear layer at the location of two lowered edge regions, which preferably form at least a portion of the circumference of the same represented element, preferably is at least 20% of the global thickness of the transparent wear layer.

It is evident that the herein above-mentioned possibilities can be combined without limitations. So, for example, a first lowered edge region, which is obtained, for example, by a chemical technique, can be wider than a second lowered edge region, which, for example, is obtained by a mechanical technique and then preferably is made deeper.

As aforementioned, the degree of foaming of said foamed layer and/or the thickness of the transparent wear layer at the location of the respective edge regions can be different. In the case of the also above-mentioned fifth possibility, the thickness of the transparent wear layer at the location of the mechanically formed lowered edge region preferably is smaller than at the location of the chemically formed lowered edge region. At the location of the chemically formed lowered edge region, the transparent wear layer may show a thickness which is equal or approximately equal to the global thickness of the transparent wear layer, for example, is at least 85% thereof, whereas the transparent wear layer at the location of the mechanically formed edge region has a smaller thickness than the global thickness of the transparent wear layer, for example, 80% or less of the global thickness.

Preferably, the floor covering material is web-shaped, wherein the printed decor preferably forms a representation of a parquet floor, wherein, for example, floor panels are depicted in adjacent rows. Preferably, the aforementioned rows extend in the longitudinal direction of said web-shaped floor covering material. In such case, the web-shaped floor covering material, on one or both long edges of the web, preferably also has a lowered edge region. Such lowered edge region may hide or mask a seam or weld to a certain extent. Preferably, one or both long edges of the web coincide with the longitudinal edges of one of said depicted rows of floor panels. Preferably, said representation shows a so-called random pattern of the depicted floor panels, wherein the positions of floor panels in adjacent rows are shifted in mutual respect in a random and/or not repetitive manner. Of course, fixed patterns are possible, too, such as a half pattern, wherein the short edges of the floor panels in a row each time approximately coincide with the center of the floor panels in an adjacent row.

It is evident that a web-shaped floor covering material with the characteristics of the invention can also form another representation than that of panel rows. So, for example, use can be made of the representation of a parquet floor in herringbone pattern or in another motif, or of the representation of ceramic tiles or natural stone tiles, whether or not in a fixed pattern.

According to the most preferred embodiment of the present invention, the printed decor represents rows of rectangular parquet panels situated adjacent to each other, preferably in random pattern. Herein, both opposite long edges of each depicted parquet panel are provided with a lowered edge region with a first geometry, wherein this lowered edge region extends over the entire respective edge, and wherein the geometry along the respective edge does not or almost not change. The lowered edge regions pertaining to represented floor panels of the same row adjoin each other and form a lowered edge region continuing over the length of the web-shaped floor covering material and having said first geometry. At both opposite short edges of each depicted parquet panel, lowered edge regions having a second geometry are provided, wherein this lowered edge region extends over the entire respective edge, and wherein the geometry along the respective edge does not or almost not change. Preferably, the lowered edge region of the first geometry is obtained by means of a mechanical technique, whereas the lowered edge region of the second geometry is obtained by means of a chemical technique, and/or the thickness of the foam layer at the location of the lowered edge regions with the first geometry is thicker than at the location of the lowered edge region with the second geometry, and/or the thickness of the transparent wear layer at the location of the lowered edge regions with the first geometry is thinner than at the location of the lowered edge region with the second geometry.

According to an alternative of the above most preferred embodiment, the lowered edge regions pertaining to the represented parquet panels of the same row can be interrupted at the location of the transverse panel edges and, thus, the lowered edge region with the second geometry. In this manner, a possible running out of the lowered edge region in transverse direction can be masked to a certain extent. Such interruption also leads to a less critical production.

Preferably, the represented tile-shaped or panel-shaped elements all have the same dimensions, or anyhow at least, in the case of rectangular elements, all have the same width.

It is clear that the floor covering material can comprise still further material layers, such as a carrier or liner and/or a superficial lacquer layer. In case that a carrier or liner is applied, this preferably relates to a glass fiber layer and/or a textile layer and/or a felt layer. The carrier or liner preferably is situated on that side of the foamed layer which is averted from the decor, or is situated internally in the foamed layer.

It is noted that the surface of the floor covering material, apart from the already mentioned lowered edge regions, can also show other relief characteristics. So, for example, the surface, at the location of the depicted elements, may show relief parts which realize a more realistic impression of the imitated element. So, for example, in the case of elements imitating wood parts or wood panels, impressions can be provided which imitate wood pores, wood nerves or wood knots. Preferably, such impressions coincide with printed portions of the decor or follow such printed portions. So, for example, a plurality of oblong impressions with the form of wood pores can follow the course of a wood nerve depicted in the decor. Preferably, such impressions are obtained by means of a mechanical technique, although it is not excluded that they would also be achieved, completely or partially, by means of a chemical technique. Preferably, the depth of such impressions is smaller than that of the lowered edge regions at the circumference of the respective element.

It is clear that the invention primarily relates to a PVC (Polyvinyl chloride) based floor covering material, although it is not excluded that the invention would be applied, for example, with linoleum-based floor covering materials, with polyurethane-based materials or with acrylate-based floor covering materials.

According to the most preferred embodiment, preferably at least the foamed layer and/or the possible transparent wear layer comprises PVC and/or fillers, such as chalk, or the foamed layer and/or the transparent wear layer substantially consists of PVC and/or fillers, such as chalk. According to an alternative embodiment, at least the foamed layer comprises an acrylate, and/or fillers, such as chalk, wherein the foamed layer preferably is at least partially obtained from a foamable plastisol of acrylate, or the foamed layer substantially consists of such acrylate and/or fillers, such as chalk.

It is also noted that the combination of lowered zones with at least two different geometries is also of interest when the printed decor of the floor covering material represents other visual units than panel-shaped or tile-shaped elements. Herein, one or more of the types of lowered zones possibly can be present in the actual surface of the respective visual unit. So, for example, in a represented stone mosaic of a random form, the internal dividing lines between the individual mosaic stones might show a first geometry, while the circumference of the form of the entire mosaic show a second geometry.

With the same aim as in the first aspect, the present invention, according to an independent second aspect, also relates to a method for manufacturing a floor covering material, wherein this floor covering material comprises at least a foamed layer, a printed decor provided thereon and a transparent wear layer, wherein the printed decor represents a plurality of panel-shaped or tile-shaped elements, wherein at the edges of said represented elements first and second lowered edge regions are formed, which both form at least a portion of the circumference of the respective element, with the characteristic that the method comprises at least the following steps:

providing a layer to be foamed, possibly on a carrier or liner;

providing an inhibitor on the layer to be foamed at the location of a second edge region to be formed, and foaming the layer to be foamed;

providing a printed decor on the layer to be foamed or already foamed;

possibly providing a transparent wear layer on the printed decor;

mechanically impressing or embossing the already foamed whole at the location of a first edge region to be formed; and possibly applying a superficial lacquer layer.

It is clear that the method of the second aspect preferably is applied for forming the floor covering material of the first aspect or the preferred embodiments thereof. Further, it is clear that within the scope of the second aspect the materials mentioned in the introduction and the further description can also be applied for the foamed layer, the liner or carrier, the wear layer, the printed decor and the superficial lacquer layer.

Further, it is noted that, instead of working with a foaming inhibitor, a foaming promoter may also be used, wherein this promoter then must be provided over a surface corresponding to the entire surface of the represented element, with the exception of the surface at the location of the second lowered edge region to be formed.

The inhibitor or promoter preferably is provided by means of a print, either with a printing roller or with a digital printing device, such as with an ink jet or valve jet.

Preferably, a transparent wear layer is provided above the printed decor. However, it is also possible that the floor covering material is free from a transparent wear layer and that, in other words, the surface of the floor covering material is formed by the printed decor. Preferably, in this case this this relates to a digitally printed decor, which is formed directly on the underlying layers of the floor covering material, preferably with the intermediary of one or more primers and/or basic layers, for example, based on PVC, such as based on PVC plastisol.

The possible superficial lacquer layer preferably is applied after the step of mechanical impression. However, it is clear that it can also be applied prior to the mechanical impression process.

The mechanical impressing preferably is performed after the possible wear layer has been partially or entirely provided. The wear layer preferably is supplied to the press element, preferably a pressing roller, in warm condition. The pressing roller preferably is cooled. The respective press element may also be provided in order to provide other mechanical impressions in the actual surface of the represented elements, such as, for example, impressions in order to imitate wood pores and the like. It is also possible that for these other mechanical impressions a separate press element is provided, preferably also a pressing roller. Further, it is possible that the aforementioned first edge regions are obtained by means of a plurality of press elements, of which the position preferably is controllable, for example, on the basis of recorded images of the printed decor. In such case, a good registration between the decor and the respective edge regions can be achieved and maintained.

Preferably, the covering material has a width between 2 and 6 meters and a length of several dozens of meters. The aforementioned second edge region, namely the edge region formed by means of the chemical technique in which the degree of foaming of the foamed layer is influenced, preferably extends transverse to the length direction of the covering material. Said first edge region, namely the edge region formed by means of the mechanical impression technique, preferably extends substantially in the longitudinal direction of the floor covering material. This combination leads to a very smooth production, in which the correspondence between the obtained edge regions and the edges of the elements represented in the printed decor is satisfactory. In the longitudinal direction of the floor covering material, a certain dimensional expansion, which even can be variable, has to be taken into account. A chemical technique for forming edge regions, which extend transverse to the length direction, can be kept in register in a simpler manner. Preferably, the inhibitor or promoter is applied by means of a printing operation, for example, by means of one or more printing rollers, or by means of an ink jet or valve jet. In width direction, a dimensional alteration of the floor covering material can be monitored in a simpler manner and is more constant. Possibly, the mechanical impressions, as aforementioned, can be performed by means of one or more press elements, which can be controlled in the width direction of the floor covering material, such that their position can be altered, for example, on the basis of camera monitoring of the printed decor.

With the first as well as with the second aspect, the printed decor can be applied by means of a printed foil, for example, a PVC foil, or by printing the decor on the foamed layer, preferably with the intermediary of one or more primers or basic layers, preferably on the basis of PVC plastisol. The printed decor preferably is protected by means of a transparent wear layer. According to a particular embodiment of the first and the second aspect, the floor covering material is free from a transparent wear layer and, in other words, the surface of the floor covering material is formed by the printed decor. Preferably, in this case this relates to a digitally printed decor which is formed directly on the underlying layers of the floor covering material, preferably with the intermediary of one or more primers and/or basic layers, for example, based on PVC, such as based on PVC plastisol. Sufficient wear resistance can be obtained in that the inks as such show a certain wear resistance, for example, because they are hardened with UV, or because they comprise PVC and/or hard particles, such as aluminum oxide, and/or in that the printed decor continues over a certain distance in depth in the underlying primers and/or basic layers, for example, over a distance of more than 0.1 millimeter.

It is also noted that the invention, according to its most general formulation, in an independent manner relates to a method for manufacturing floor or wall covering material, wherein this covering material comprises at least a foamed layer and a printed decor provided thereon, with the characteristic that the method comprises at least the following steps:

providing a layer to be foamed, preferably on a carrier or liner;

providing a foaming inhibitor or foaming promoter on the layer to be foamed and foaming the layer to be foamed, for example, by means of a printing technique by means of one or more rollers, or by means of an ink jet or valve jet;

providing a printed decor on the layer to be foamed or already foamed;

mechanically impressing the already printed whole and preferably already foamed whole.

Thus, according to the above more general independent aspect the invention relates to a covering material which has relief characteristics obtained by a chemical technique, namely relief characteristics obtained by influencing the degree of foaming of the layer to be foamed, as well as relief characteristics obtained by a mechanical technique, namely by locally impressing the surface of the covering material. It is evident that the invention of the second aspect forms a preferred example of this more general aspect and that the covering material of the first aspect can be obtained by means of the method of the present, more general aspect. According to another example, the mechanical technique is at least applied for forming wood pores, wood nerves, matte or glossy zones and the like. Herein, this concerns the finer relief characteristics. The chemical technique preferably is at least applied for forming lowered edge regions and relief characteristics such as wood knots, cracks, gaps and the like. Herein, this relates to the coarser relief characteristics.

It is evident that the composition of the obtained covering material and the materials applied therein, as well as the applied devices within the scope of this more general aspect can be the same as already discussed above within the scope of the first and/or the second aspect, wherein then it is not necessary that lowered edge regions are formed by means of the respective technique.

Preferably, the thickness of the possible wear layer at the location of the mechanical impressions is thinner than at the location of the chemically formed relief parts or structural elements.

BRIEF DESCRIPTION OF THE DRAWINGS

With the intention of better showing the characteristics of the invention, herein below, as examples without any limitative character, some preferred embodiments are described, with reference to the accompanying drawings, wherein:

FIGS. 2 and 3, at a larger scale, represent a cross-section according to the line II-II, III-III, respectively, represented in FIG. 1;

FIGS. 4 and 5, in similar views as FIGS. 2 and 3, respectively, represent a variant; and FIGS. 6 and 7, in similar views as FIGS. 2 and 3, respectively, represent another variant.

DETAILED DESCRIPTION OF THE INVENTION

Figure 1:
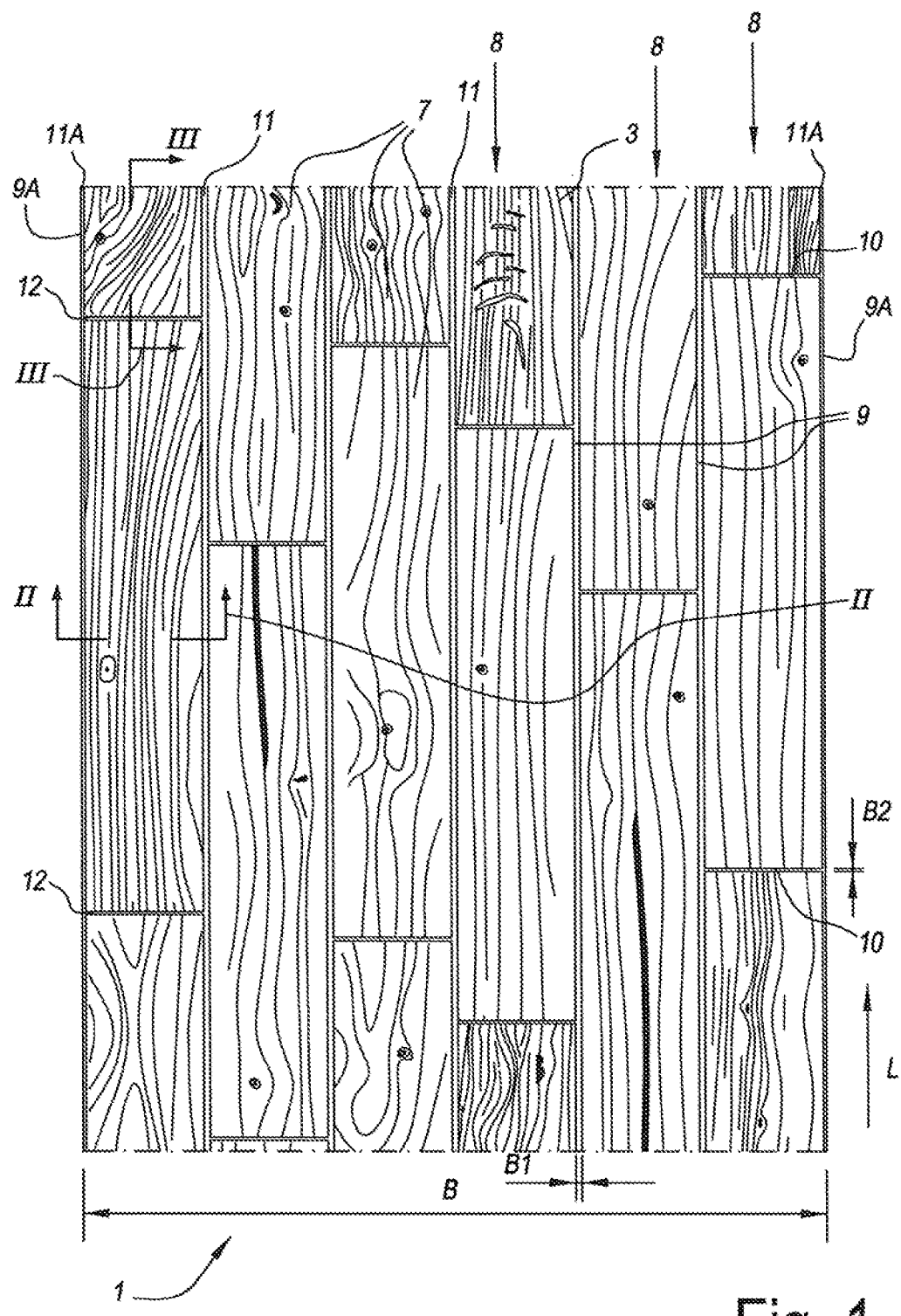
FIG. 1 in top view represents a floor covering material with the characteristics of the invention.

FIG. 1 represents a portion of a floor covering material 1. In this case, this relates to a web-shaped floor covering material 1. The width B of such floor covering material 1 can vary between 2 and 6 meters and preferably is from 3.5 to 5.5 meters. The length L can be various dozens of meters, for example, between 20 and 50 meters. In the example, this relates to a floor covering material 1 which is supplied from a roll.

FIG. 2 clearly shows that this floor covering material 1 comprises at least a foamed layer 2 and a printed decor 3 provided thereon. The foamed layer 2 relates to a foamed PVC layer, or so-called "cushion vinyl". In this case, the printed decor 3 is provided as a printed PVC foil 4 having, for example, a thickness of 60 micrometers to 150 micrometers. In this case, a transparent wear layer 5 is provided above the printed decor 3. The wear layer 5 preferably has a thickness T1 of 0.15 to 0.75 millimeters, and still better between 0.25 and 0.55 millimeters. The overall thickness T of the floor covering material 1 can be between 2 and 5 millimeters, preferably from 2 through 3.5 millimeters.

In the example, said foamed layer 2 is provided on a liner 6 of felt.

The printed decor 2 represents a plurality of panel-shaped elements 7, in this case panel-shaped elements 7, which form an imitation of parquet panels. The elements 7 are rectangular and are represented in a random pattern in adjacent rows 8.

At the edges 9-10 of the represented elements 7, lowered edge regions 11-12 are formed, which, in the example, form the entire circumference of each element 7. Herein, the lowered edge regions 11-12, viewed in the cross-section of FIGS. 2 and 3, are realized with at least two different geometries. The lowered edge region 11 which extends along a first pair of opposite edges 9, namely, along the pair of long edges, has, as represented in the cross-section of FIG. 2, a geometry which is different from the geometry of the lowered edge region 12 which extends along a second pair of opposite edges 10, namely, along the pair of short edges, as represented in the cross-section of FIG. 3. In this case, the difference between the two geometries is manifold. The edge region which extends along the long edges 9 has a smaller depth D1, a smaller width B1 at the surface, and a higher inclination A1 of the walls than the depth D2, width B2 and inclination A2 in the case of the edge region 12 which extends along the short edges 10. The edge region 11 which extends along the long edges 9 rather is V-shaped, whereas the edge region 12 which extends along the short edges 10 rather is U-shaped, considering that the respective edge region 10 clearly has a bottom part 13. The degree of foaming at the location of the longitudinal edge region 11 is higher than the degree of foaming at the location of the transverse edge region 12. The printed decor 3, at the edge region 12 of the short edges 10, is situated on a lower level N2 than the level N1 in the case of the edge region 11 of the long edges 9.

In FIG. 2, it is further also shown that a lowered edge region 11A can also be present at the edge 9A of the web. In this case, such edge region 11A coincides with the edge of a represented row 8. Preferably, such edge region 11A has a geometry which corresponds to a half of a lowered edge region 11 which is situated at the long edges 9 internally in the floor covering material 1.

The edge region 11 represented in FIG. 2 in this case is obtained by mechanically deforming or impressing the transparent wear layer 5, whereas the edge region 12 represented in FIG. 3 is obtained by a chemical technique, namely, in that at the location of the edge region 12 to be formed a foaming inhibitor is provided prior to foaming the foamed layer 2. Therefore, it is clear that the floor covering material 1 of the FIGS. 1 to 3 is obtained or can be obtained by means of a method with the characteristics of the second aspect of the invention.

Apart from the lowered edge regions 11A-11-12, the surface of the floor covering material 1 further also comprises relief parts 14 at the location of the actual element 7 represented in the printed decor 2. In this case, this relates to imitations of wood pores obtained by mechanically impressing the transparent wear layer 5.

FIGS. 4 and 5 represent a variant and practical embodiment, wherein the floor covering material 1 comprises two separately formed foam layers 2-15, namely, a first foamed layer 2, which is provided on a liner 6, and a second foamed layer 15, which is situated there above. The printed decor 3 is printed directly on the second foamed layer 15. The lowered edge region 11 of FIG. 4 is obtained by a mechanical impression, whereas the lowered edge region 12 of FIG. 5 is obtained by a chemical technique. In order to realize the edge region 12 of FIG. 5, the degree of foaming of the second foamed layer 15 is influenced by means of a foaming inhibitor. The lowered edge regions 11-12 of FIGS. 4 and 5 have a mutually differing geometry, for example, in that the walls show a different degree of inclination A1-A2.

FIGS. 6 and 7 represent another embodiment, similar to the one of FIGS. 2 and 3, respectively, however, wherein the printed decor 3 forms the surface of the floor covering material 1 and wherein, in other words, the transparent top layer 5 is omitted. The printed decor 3 is formed directly on the floor covering material 1 and has a thickness T2 of 0.1 millimeters or more in that it has penetrated into a PVC layer situated at the surface, such that a certain wear resistance is obtained. For the rest, the geometry of the lowered edge region 11 of FIG. 6 is similar to that of FIG. 2, and for the rest, the geometry of the lowered edge region 12 is equal to that of FIG. 3. The respective lowered edge regions 11-12 are also obtained in a similar manner.

In general, it is also noted that the combination of at least two different geometries for lowered edge regions and/or the combination of mechanical and chemical embossing techniques can also be applied for wall coverings.

The present invention is in no way limited to the embodiments described by way of example and represented in the figures, on the contrary may such floor covering materials and methods be realized according to various variants, without leaving the scope of the invention.

The invention claimed is:

1. A floor covering material, wherein the floor covering material comprises at least a foamed layer, a printed decor provided thereon, and a transparent wear layer,
   wherein the printed decor represents a plurality of panel-shaped or tile-shaped elements,
   wherein each of the plurality of panel-shaped or tile-shaped elements comprise an upper surface and edges forming a perimeter of one of the plurality of panel-shaped or tile-shaped elements, wherein said edges comprise walls that extend below the upper surface of the one of the plurality of panel-shaped or tile-shaped elements, wherein the floor covering material is a web-shaped floor covering material, wherein the printed decor forms a representation of a floor, wherein said plurality of panel-shaped or tile-shaped elements represent a plurality of floor panels in adjacent-situated rows, wherein said rows extend in the longitudinal direction of said web-shaped floor covering material,
   wherein the edges comprise at least a first pair of opposite edges and a second pair of opposite edges, wherein the first pair of opposite edges comprise a first geometry on a first edge, and the second pair of opposite edges comprise a second geometry on a second edge, wherein the second edge is adjacent to said first edge and said first and second geometries are different, and wherein the first pair of opposite edges and the second pair of opposite edges form the entire perimeter of at least one of the plurality of panel-shaped or tile-shaped elements,
   wherein a wall of the first pair of opposite edges of one of the plurality of panel-shaped or tile-shaped elements forms a first lowered edge region with a wall of the first pair of opposite edges of an adjacent panel-shaped or tile-shaped element and
   a wall of the second pair of opposite edges of one of the plurality of panel-shaped or tile-shaped elements forms a second lowered edge region with a wall of the second pair of opposite edges of an adjacent panel-shaped or tile-shaped element,
   wherein a degree of foaming of said foamed layer at a location of the first lowered edge region of the first pair of opposite edges is different than a degree of foaming from a location of a second lowered edge region of the second pair of opposite edges,
   and wherein the first lowered edge region has a deepest point which is situated lower than a deepest point of the second lowered edge region.

2. The floor covering material of claim 1, wherein said plurality of panel-shaped or tile-shaped elements are rectangular.

3. The floor covering material of claim 1, wherein the floor covering material is selected from the group comprising a PVC-based floor covering material, a linoleum-based floor covering material, a polyurethane-based floor covering material, and an acrylate-based floor covering material.

4. The floor covering material of claim 1, wherein each of the plurality of panel-shaped or tile-shaped elements are arranged parallel so that the first pair of opposite edges is a short edge and the second pair of opposite edges is a long edge.

5. The floor covering material of claim 1, wherein an adjacent panel-shaped or tile-shaped element adjoins a neighboring panel-shaped or tile-shaped element at the opposite edges.

6. The floor covering material of claim 1, wherein either the first lowered edge region or the second lowered edge region of adjacent panel-shaped or tile-shaped elements is V-shaped and/or the other is U shaped.

7. The floor covering material of claim 1, wherein either the first lowered edge region or the second lowered edge region is made by chemical technique using a foam inhibitor and the other is made mechanically.

8. The floor covering material of claim 1, wherein the first lowered edge region at the upper surface of the floor covering material has a width which is more than a width of the second lowered edge region at the upper surface of the floor covering material.

9. A method for manufacturing a floor covering material, wherein the floor covering material comprises at least a foamed layer, a printed decor provided thereon and a transparent wear layer,
   wherein the method comprises at least the following steps:
      providing a layer to be foamed;
      providing an inhibitor on the layer to be foamed at the location of the second edge region to be formed, and foaming the layer to be foamed, wherein a degree of foaming of said foamed layer at a location of the first lowered edge region of the first pair of opposite edges is different than a degree of foaming from a location of a second lowered edge region of the second pair of opposite edges;
      providing the printed decor on the layer to be foamed or already foamed, wherein the printed decor represents a plurality of panel-shaped or tile-shaped elements that forms a representation of a floor,
      wherein each of the plurality of panel-shaped or tile-shaped elements comprise an upper surface and edges forming a perimeter of one of the plurality of panel-shaped or tile-shaped elements, wherein said edges comprise walls that extend below the upper surface of the one of the plurality of panel-shaped or tile-shaped elements;
      providing the transparent wear layer on the printed decor;
      mechanically embossing the already foamed whole at the location of the first edge region to be formed, wherein the floor covering material is a web-shaped floor covering material, wherein said plurality of panel-shaped or tile-shaped elements represent a plurality of floor panels in adjacent-situated rows, wherein said rows extend in the longitudinal direction of said web-shaped floor covering material, wherein the edges comprise at least a first pair of opposite edges and a second pair of opposite edges, wherein the first pair of opposite edges comprise a first geometry on a first edge, and the second pair of opposite edges comprise a second geometry on a second edge, wherein the second edge is adjacent to said first edge and said first and second geometries are different, and wherein the first pair of opposite edges and the second pair of opposite edges form the entire perimeter of at least one of the plurality of panel-shaped or tile-shaped elements, wherein a wall of the first pair of opposite edges of one of the plurality of panel-shaped or tile-shaped elements forms a first lowered edge region with a wall of the first pair of opposite edges of an adjacent panel-shaped and a wall of the second pair of opposite edges of one of the plurality of panel-shaped or tile-shaped elements forms a second lowered edge region with a wall of the second pair of opposite edges of an adjacent panel-shaped or tile-shaped element, wherein the first lowered edge region has a deepest point which is situated lower than a deepest point of the second lowered edge region.

10. A floor covering material, wherein the floor covering material comprises at least a foamed layer, a printed decor provided thereon, and a transparent wear layer, wherein the printed decor represents a plurality of panel-shaped or tile-shaped elements, wherein said plurality of panel-shaped or tile-shaped elements are rectangular, wherein each of the plurality of panel-shaped or tile-shaped elements comprise an upper surface and edges forming a perimeter of one of the plurality of panel-shaped or tile-shaped elements, wherein said edges comprise walls that extend below the upper surface of the one of the plurality of panel-shaped or tile-shaped elements, wherein the edges comprise at least a first pair of opposite edges and a second pair of opposite edges, wherein the first pair of opposite edges comprise a first geometry on a first edge, and the second pair of opposite edges comprise a second geometry on a second edge, wherein the second edge is adjacent to said first edge and said first and second geometries are different, and wherein the first pair of opposite edges and the second pair of opposite edges form the entire perimeter of at least one of the plurality of panel-shaped or tile-shaped elements, wherein the walls of the first pair of opposite edges form a first angle with respect to the upper surface which is steeper than a second angle formed by the walls of the second pair of opposite edges with respect to the upper surface, wherein a wall of the first pair of opposite edges of one of the plurality of panel-shaped or tile-shaped elements forms a first lowered edge region with a wall of the first pair of opposite edges of an adjacent panel-shaped or tile-shaped element or a wall of the second pair of opposite edges of one of the plurality of panel-shaped or tile-shaped elements forms a second lowered edge region with a wall of the second pair of opposite edges of an adjacent panel-shaped or tile-shaped element wherein a degree of foaming of said foamed layer at a location of the first lowered edge region of the first pair of opposite edges having the first geometry is different than a degree of foaming from a location of the second lowered edge region of the second pair of opposite edges having the second geometry.

11. The floor covering material of claim 10, wherein the floor covering material is a web-shaped floor covering material, wherein the printed decor forms a representation of a parquet floor, wherein floor panels are depicted in adjacent-situated rows.

12. The floor covering material of claim 11, wherein said rows extend in the longitudinal direction of said web-shaped floor covering material.

13. The floor covering material of claim 10, wherein a thickness of the foam layer at the location of the lowered edge regions with the first geometry is thicker than at the location of the lowered edge region with the second geometry.

14. The floor covering material of claim 10, wherein either the first lowered edge region or the second lowered edge region of adjacent panel-shaped or tile-shaped elements is V-shaped and/or the other is U shaped.

15. The floor covering material of claim 10, wherein either the first lowered edge region or the second lowered edge region is made by chemical technique using a foam inhibitor and the other is made mechanically.

16. The floor covering material of claim 10, wherein the first and second geometries being different further comprises at least one or more of the following features, the first lowered edge region has a deepest point which is situated lower than a deepest point of the second lowered edge region;

the first lowered edge region at the upper surface of the floor covering material has a width which is more than a width of the second lowered edge region at the upper surface of the floor covering material.

17. The floor covering material of claim 10, wherein each of the plurality of panel-shaped or tile-shaped elements are arranged parallel so that the first pair of opposite edges is a short edge and the second pair of opposite edges is a long edge.

18. The floor covering material of claim 10, wherein an adjacent panel-shaped or tile-shaped element adjoins a neighboring panel-shaped or tile-shaped element at the opposite edges.

19. The floor covering material of claim 10, wherein the floor covering material is selected from the group comprising a PVC-based floor covering material, a linoleum-based floor covering material, a polyurethane-based floor covering material, and an acrylate-based floor covering material.

20. A floor covering material, wherein the floor covering material comprises at least a foamed layer, a printed decor provided thereon, and a transparent wear layer, wherein the printed decor represents a plurality of panel-shaped or tile-shaped elements, wherein said plurality of panel-shaped or tile-shaped elements are rectangular, wherein each of the plurality of panel-shaped or tile-shaped elements are arranged parallel so that the first pair of opposite edges is a short edge and the second pair of opposite edges is a long edge;

wherein each of the plurality of panel-shaped or tile-shaped elements comprise an upper surface and edges forming a perimeter of one of the plurality of panel-shaped or tile-shaped elements, wherein said edges comprise walls that extend below the upper surface of the one of the plurality of panel-shaped or tile-shaped elements, wherein the edges comprise at least a first pair of opposite edges and a second pair of opposite edges, wherein the first pair of opposite edges comprise a first geometry on a first edge, and the second pair of opposite edges comprise a second geometry on a second edge, wherein the second edge is adjacent to said first edge and said first and second geometries are different, and wherein the first pair of opposite edges and the second pair of opposite edges form the entire perimeter of at least one of the plurality of panel-shaped or tile-shaped elements, wherein a wall of the first pair of opposite edges of one of the plurality of panel-shaped or tile-shaped elements forms a first lowered edge region with a wall of the first pair of opposite edges of an adjacent panel-shaped or tile-shaped element or a wall of the second pair of opposite edges of one of the plurality of panel-shaped or tile-shaped elements forms a second lowered edge region with a wall of the second pair of opposite edges of an adjacent panel-shaped or tile-shaped element, wherein the first lowered edge region at the upper surface of the floor covering material has a width which is more than a width of the second lowered edge region at the upper surface of the floor covering material wherein a degree of foaming of said foamed layer at a location of the first lowered edge region of the first pair of opposite edges having the first geometry is different than a degree of foaming from a location of the second lowered edge region of the second pair of opposite edges having the second geometry.

21. The floor covering material of claim 20, wherein the floor covering material is selected from the group comprising a PVC-based floor covering material, a linoleum-based floor covering material, a polyurethane-based floor covering material, and an acrylate-based floor covering material.

* * * * *